United States Patent
Muthukrishnan et al.

(10) Patent No.: US 7,249,136 B1
(45) Date of Patent: Jul. 24, 2007

(54) SPACE- AND TIME-EFFICIENT MANAGEMENT AND SUMMARIZATION OF DATA USING INTERMEDIATE SUMMARY STRUCTURE AND HIERARCHICAL MULTIDIMENSIONAL HISTOGRAM

(75) Inventors: Shanmugavelayutham Muthukrishnan, Washington, DC (US); Martin J. Strauss, Summit, NJ (US)

(73) Assignee: AT&T Corp., New York, NY (US)

( * ) Notice: Subject to any disclaimer, the term of this patent is extended or adjusted under 35 U.S.C. 154(b) by 476 days.

(21) Appl. No.: 10/822,996

(22) Filed: Apr. 13, 2004

Related U.S. Application Data (60) Provisional application No. 60/502,154, filed on Sep. 11, 2003.

(51) Int. Cl.
*G06F 17/30* (2006.01)
(52) U.S. Cl. ...................... 707/101; 707/100
(58) Field of Classification Search ........... 707/100, 707/8, 200
See application file for complete search history.

(56) References Cited

U.S. PATENT DOCUMENTS

| | | | | |
|---|---|---|---|---|
| 6,226,636 | B1 * | 5/2001 | Abdel-Mottaleb et al. ...... | 707/4 |
| 6,272,498 | B1 | 8/2001 | Muthukrishnan et al. | |
| 6,574,372 | B2 | 6/2003 | Ratnakar | |
| 6,751,363 | B1 * | 6/2004 | Natsev et al. ............... | 382/305 |
| 6,760,724 | B1 * | 7/2004 | Chakrabarti et al. .......... | 707/4 |
| 7,177,282 | B1 * | 2/2007 | Gilbert et al. .............. | 370/241 |
| 2003/0123739 | A1 | 7/2003 | Graffagnino | |

OTHER PUBLICATIONS

Thaper, Nitin; Guha, Sudipto; Indyk, Piotr; and Koudas, Nick, "Dynamic Multidimensional Histograms," *ACM SIGMOD 2002*, Madison, Wisconsin, USA (Jun. 4-6, 2002).

Thaper, Nitin; Guha, Sudipto; Indyk, Piotr; and Koudas, Nick, "Dynamic Multidimensional Histograms," *ACM SIGMOD 2002*, Madison, Wisconsin, USA (Jun. 4-6, 2002).

* cited by examiner

*Primary Examiner*—Cheryl Lewis

(57) ABSTRACT

A method maintains a multidimensional histogram for a data array having a data array size, the method having a processing time substantially less than proportional to the data array size. The method involves (104) receiving a data update that indicates a change to data in the data array; (106) with the data update, updating an intermediate data structure having a size substantially smaller than the data array size, so that the updated intermediate data structure remains an at-least-approximate representation of the data in the data array as changed by the data update; (110) collecting a number of substantially-largest-coefficient linear combinations of then-current data, the number being small compared with the data array size; and (114) forming the multidimensional histogram as a histogram to an intermediate data array re synthesized from the collected linear combinations. Another method prepares a multidimensional histogram for a data array, the data array characterized by a data array size and including data, the method having an execution time proportional to the data array size and using an amount of storage space substantially smaller than the data array size. The method involves (802) receiving data from the data array; (802) transforming the data into linear combinations of data items, or of approximations of the linear combinations of data items; (804) collecting a moderate number of substantially-largest-coefficient linear combinations of the data; and (806) forming the multidimensional histogram as a histogram to the collected linear combinations.

7 Claims, 10 Drawing Sheets

SPACE-AND TIME-EFFICIENT MANAGEMENT AND SUMMARIZATION OF DATA USING INTERMEDIATE SUMMARY STRUCTURE AND HIERARCHICAL MULTIDIMENSIONAL HISTOGRAM

CROSS-REFERENCE TO RELATED APPLICATION

This patent application claims priority to related U.S. provisional application No. 60/502,154, filed Sep. 11, 2003, the contents of which are incorporated herein by reference in their entirety.

BACKGROUND OF THE INVENTION

1. Field of the Invention

The invention generally relates to arrangements for managing and summarizing data in a time-efficient manner so as to represent the data using less storage space in data storage devices. More particularly, the invention relates to arrangements for managing and summarizing data by using an intermediate summary structure to ultimately form a hierarchical histogram that is nearly optimal for multidimensional data, even multidimensional data that is subject to changes.

2. Related Art

To conserve memory space in data storage devices, especially in large database scenarios, and for visualizing data and computing approximately with data, it is desirable to represent data by summarizing it and placing summary data in a summary data structure that occupies a substantially smaller amount of memory than the original data. Symbolically, data may be an array A of numbers that is indexed by two or more integer keys. In a two-dimensional case, the (i,j)'th datum is denoted $A[i,j]$. A histogram is another array H with indices that match A's, such that $H[i,j]$ is constant on rectangles of (i,j)'s. A goal is to find a histogram that minimizes the sum, over all i and j, of the square of $|A[i,j]-H[i,j]|$.

As used herein, there are several notions of efficiency, including space efficiency, time efficiency, and communication efficiency. (The following discussion does not constitute an admission that the discussed concepts constitute "prior art.")

Concerning space efficiency, a B-bucket histogram is a space-efficient representation because it requires about 5B numbers to store the boundaries and heights of each bucket. (There are more efficient ways to store histograms that are hierarchical.) Also, there is space efficiency of a histogram sketch (in a dynamic data scenario—in which data is subject to change) and of the method's workspace (in a static data scenario—in which the data does not change). Typically, the size of a histogram sketch is somewhat bigger than 5B numbers, but much smaller than the $N^2$ numbers needed to store the entire dataset.

Time efficiency relates to performance of various operations, such as updates to sketches and construction of histograms at top level, and also the constituent operations.

Finally, the size of structures such as sketches is related to communication efficiency. Larger structures consume greater amounts of communication bandwidth, and, accordingly, it would be desirable to use smaller data structures if communication thereof is needed, provided the data structures do not unduly sacrifice accuracy of the data they represent.

Various known arrangements may be considered efficient in one or another of these respects. However, conventional arrangements have not been efficient in space, time and communication efficiency simultaneously, especially for multidimensional data.

Of course, an overriding concern is that the transformation of the data to the summary data structure retain as much or the original data's meaning as possible, so that the summary structure accurately represents the original data. That is, there should be quality guarantees (guarantees of how accurately the summary data represents the original data). Concurrently, it is desirable that there be useful guarantees about the time, space, and bandwidth used, especially for multidimensional data.

SUMMARY

A method maintains a multidimensional histogram for a data array having a data array size, the method having a processing time substantially less than proportional to the data array size. The method involves receiving a data update that indicates a change to data in the data array; with the data update, updating an intermediate data structure having a size substantially smaller than the data array size, so that the updated intermediate data structure remains an at-least-approximate representation of the data in the data array as changed by the data update; collecting a number of substantially-largest-coefficient linear combinations of then-current data, the number being small compared with the data array size; and forming the multidimensional histogram as a histogram to an intermediate data array re synthesized from the collected linear combinations.

Another method prepares a multidimensional histogram for a data array, the data array characterized by a data array size and including data, the method having an execution time proportional to the data array size and using an amount of storage space substantially smaller than the data array size. The method involves receiving data from the data array; transforming the data into linear combinations of data items, or of approximations of the linear combinations of data items; collecting a moderate number of substantially-largest-coefficient linear combinations of the data; and forming the multidimensional histogram as a histogram to the collected linear combinations.

BRIEF DESCRIPTION OF THE DRAWINGS

A more complete appreciation of the described embodiments is better understood by reference to the following Detailed Description considered in connection with the accompanying drawings, in which like reference numerals refer to identical or corresponding parts throughout, and in which.

DETAILED DESCRIPTION

In describing embodiments illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose. Various terms that are used in this specification are to be given their broadest reasonable interpretation when used to interpret the claims.

Moreover, features and procedures whose implementations are well known to those skilled in the art are omitted for brevity. For example, initiation and termination of loops may be only briefly mentioned or illustrated, their details being easily surmised by skilled artisans. Thus, the steps involved in methods described herein may be readily implemented by those skilled in the art without undue experimentation.

Further, various aspects, features and embodiments of the presence indication arrangement may be described as a process that can be depicted as a flowchart, a flow diagram, a structure diagram, or a block diagram. Although a flowchart may describe the operations as a sequential process, many of the operations can be performed in parallel, concurrently, or in a different order than that described. Operations not needed or desired for a particular implementation may be omitted. A process or steps thereof may correspond to a method, a function, a procedure, a subroutine, a subprogram, and so forth, or any combination thereof.

Certain blocks may be shown in dotted lines to emphasize that they are optional. Of course, the presence of blocks with solid lines does not imply that they are necessary for all embodiments, or that the claims should be limited to having the functions described in those blocks.

Very briefly, one inventive arrangement involves maintaining nearly-optimal histograms for static or for dynamic data, using an intermediate summary structure that is small in size. The intermediate summary structure may be updated to reflect any changes in the data (the dynamic data scenario), and a final histogram is produced from the intermediate summary structure.

One embodiment involves transforming input data into a domain of tensor products of Haar wavelets (TPHWs). That is, instead of working with the original data A[i,j] as described in the Background, the arrangement works with certain linear combinations (TPHW's) of the A[i,j]'s, each having a label and coefficient. Each index to the data contributes to only a small number of TPHWs.

Then, a moderate number of the TPHW's having the largest magnitude is found. The largest-magnitude TPHWs may be found, for example, using techniques based on error correcting codes. Using an error-correcting-code-based construction allows finding the large-magnitude TPHW's without having to instantiate all TPHW's. An intermediate representation is used because a moderately-sized intermediate representation has enough information from which to ultimately construct a near-optimal histogram. TPHWs may be used as the intermediate representation because each data item and each potential histogram bucket interacts with just a small number of TPHW's, and accordingly, computation is quick.

Finally, a best hierarchical 4B bucket histogram to the data represented by the collection of TPHW's is found (B is a user parameter). As used herein, a "hierarchical" histogram is a histogram on a hierarchical partitioning of an overall rectangle, which is formed either by taking the overall rectangle itself or by partitioning the overall rectangular region into two subrectangles by a single cut, then forming a hierarchical partitioning of each subrectangle. This best 4B bucket hierarchical histogram is automatically at least as good as the best B-bucket general histogram (not necessarily a hierarchical histogram) as an approximation to the intermediate representation. The resulting 4B-bucket (hierarchical) histogram is nearly as good as the best B-bucket histogram (hierarchical or not) for the original data. The final histogram may be found using, for example, dynamic programming techniques. A best hierarchical histogram, rather than the best general histogram, is found because dynamic programming only works in a straightforward way with hierarchical histograms.

Terminology. The embodiment may be understood with reference to the following definitions, conventions, and examples that should not be used to limit the scope of the invention.

Data in an N by N array comprises values indexed by two integers (for a two-dimensional case), each index being an integer in the range zero through N−1. A histogram approximation to the data is constructed, that includes a collection of rectangles (called buckets) that partition the N by N square indexing the data. Assigned to each bucket is a bucket height. A query is an index (two integers from zero to N). To answer a query approximately from the histogram, the height of the histogram bucket containing that query is returned.

The constructed histogram has a small error. Error may be measured as the sum, over all queries, of the square of the difference between the true value at the query and the approximate answer for that query. An ideal histogram would be constrained to have at most B buckets, where B is a user parameter. According to one embodiment, a histogram with 4B buckets is constructed; bucketing and heights are chosen so as to minimize error.

A "sketch" is any small object capable of quickly supporting updates and one or more types of queries, to which it gives approximate answers. Sketches are directly used only in a dynamic data scenario. There are several types of sketches, each with associated queries. Accordingly, sketches may be qualified according to the types of queries they are designed to answer. For example, a "histogram sketch" is distinguished from a "count sketch" and an "identification sketch." A histogram sketch of data stores the same thing as a count sketch and identification sketch of TPHWs of the data. Expressed formally: a histogram sketch answers with a 4B-bucket histogram in response to "histogram queries," whereas a count sketch answers with counts of objects (here, TPHWs) in response to a "count query" (a label of an object; here a TPHW). As an aside, the parameter B and other parameters such as the approximation factor and failure probability are fixed and implicit in the use of any of these sketches; these parameters are not associated with a count query or histogram query, since there is no choice to be made at the time of a query. An identification sketch answers "identification queries" with the labels of the objects (here, TPHWs) with the largest counts.

A "point query" is associated with two integers in the range 0 to N, with the intention that the ideal answer to a point query (i,j) is a datum A(i,j) at the time of the point query. In the static data scenario, a count sketch and other dynamic machinery are used to handle dynamism arising from the method's internal workings, rather than from externally-supplied updates; the method's internal workings can be regarded as generating count queries.

Typically, a sketch is abstract—for example, there is no single natural way to answer point queries from a sketch. As used herein, each sketch used includes a collection of linear combinations of data. The choice of linear combinations to keep is influenced by many things, including the structure of TPHWs and random "coin flips" made by the method.

"Robust representations" are distinguished from sketches. By themselves, robust representations do not support updates. Like a sketch, a robust representation is an intermediate representation but is more concrete. A robust representation R, like a histogram or the original data, is completely specified by data values R[i,j] at all the points indexed by (i,j). It is constant on a small number of simple regions, but, because the these regions are not rectangles, it is not so useful to regard it as a histogram. A robust representation is a linear combination of TPHWs. Each TPHW includes a partition of (in the example used herein) an N-by-N array into: at most five "regions"; at most four "rectangles"; and a "remainder" that is typically not a rectangle. A TPHW is constant over each of the "regions."

As used in this specification, a "hierarchical" histogram is either the 1-bucket histogram or, recursively, two hierarchical histograms on smaller index sets with a single boundary between them. That is, the bucketing of a hierarchical histogram results from starting with the N-by-N square as a singleton collection of rectangles, and, B-1 times, selecting a rectangle from the collection and cutting it into two pieces by a single vertical or horizontal cut.

The concepts of "anchor," "anchored subrectangle," "anchored histogram," "join," and "joinable" are described as follows. Given a robust representation R, an "anchor" with respect to R is a horizontal or vertical boundary position appearing in R. An "anchored subrectangle" is a subrectangle, within an N-by-N data structure, whose top, bottom, left side, and right side are anchors. An "anchored histogram" is a histogram, all the rectangles of whose partition are anchored. First and second rectangles are said to be "joinable" if the left side of the first rectangle is the right side of a second rectangle, or if the top of the first rectangle is the bottom of the second rectangle. Given hierarchical partitions of two joinable rectangles, one can naturally "join" the partitions to obtain a hierarchical partition of the rectangle formed by joining the two joinable rectangles.

Various embodiments. Reference is now made to the accompanying drawing figures for review with the following description of embodiments.

Figure 1:
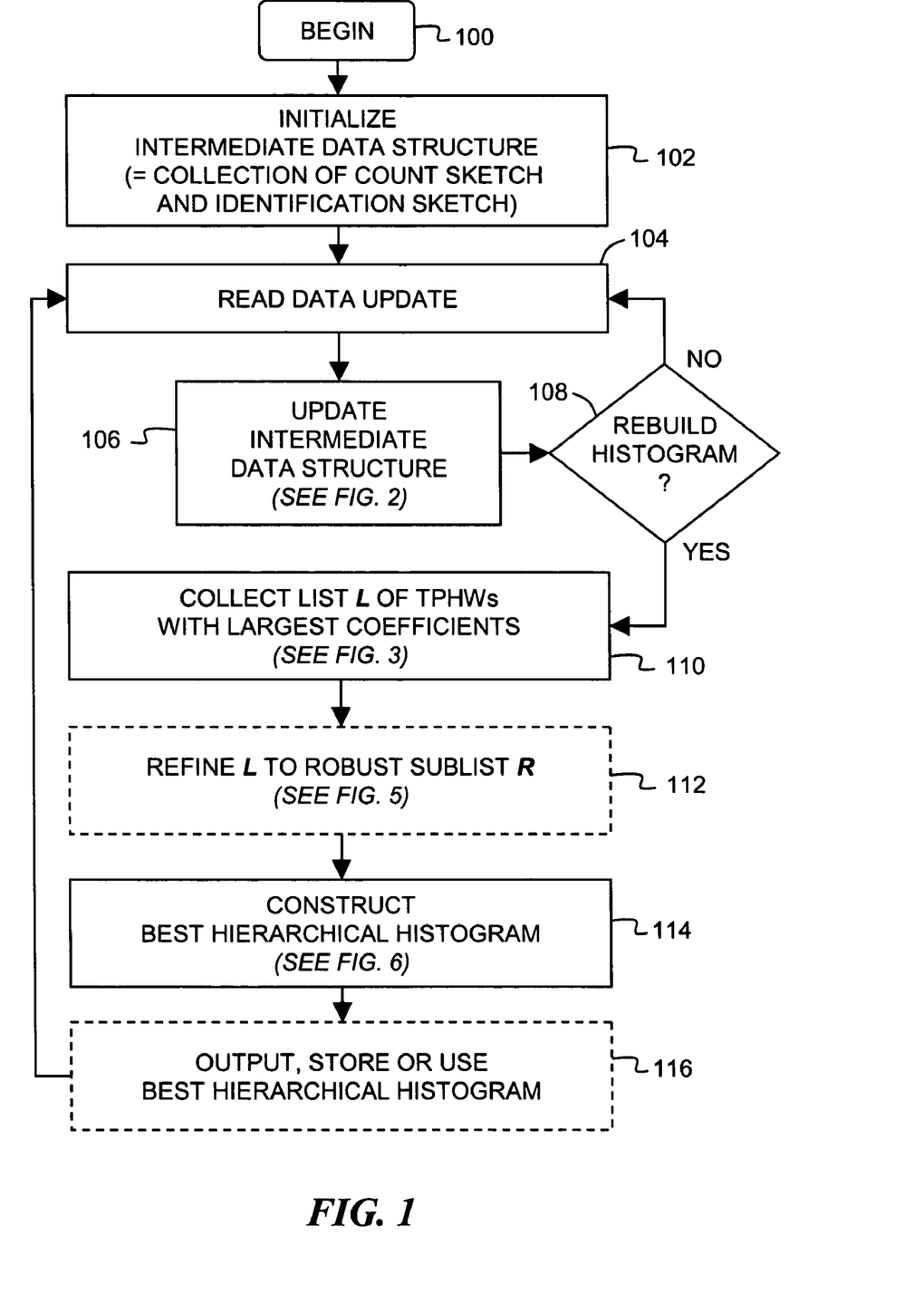
FIG. 1 is a high-level flowchart illustrating an embodiment of a method of creating a multidimensional histogram that is nearly-optimal for dynamic (changing) data.

FIG. 1 is a high-level flowchart illustrating an embodiment of a method of creating a multidimensional histogram that is nearly-optimal for dynamic (changing) data.

After the process begins (indicated by block 100), block 102 indicates the initialization of an intermediate data structure. As understood within this disclosure, an intermediate data structure constitutes a collection of a count sketch and an identification sketch (the latter being abbreviated "ID sketch"). These terms are explained above. Briefly, the initialization of the count sketch and ID sketch involves initializing several counters to zero, flipping some coins, and storing the coin flip outcomes.

Block 104 indicates the reading of a data update, and block 106 indicates the updating of the intermediate data structure according to the content of the data update. As the FIG. 1 embodiment involves dynamic data, a data update essentially involves changing certain items in the intermediate data structure. The details of one implementation of block 106 are explained below, with reference to FIG. 2.

After the intermediate data structure is updated, control passes to a decision block 108. Decision block 108 indicates a determination of whether or not a histogram is to be rebuilt at this time (before reading any more data updates). Here, of course, the concept of "re"-building includes the initial building of a histogram if it has not been built before. The scenario that demonstrates the use of dynamically updating data involves a choice, after each data update input, of whether to rebuild a histogram.

In any event, the determination of whether to build or rebuild a histogram, can be based on one or more of a variety of criteria, and can be based on information from a variety of sources, including, for example:

The histogram is rebuilt after every update, or after every k updates (where k is a user parameter).

The histogram is rebuilt if k seconds have passed since the last build (where k is a user parameter).

The histogram is rebuilt upon request via an input channel separate from the channel by which updates arrive.

If the histogram is not to be rebuilt at the present time, control passes back to block 104 so that additional data updates can be read. The loop, including blocks 104, 106, and 108 is repeated until it is decided that a histogram should be rebuilt, at which time control passes to block 110.

Block 110 indicates the collecting, from the data in the histogram sketch, of a list L of tensor products of Haar wavelets (TPHWs) having the largest coefficients. The details of one implementation of this step are described below, with reference to FIG. 3.

Thereafter, as an optional step, the list L may be refined to a sublist R that is robust, as indicated by block 112. As understood within this disclosure, the term "robust" means "little improved as a representation for the original data by changing coefficients or adding an additional TPHW," and has been described briefly above, in the Terminology subsection. Block 112 is shown in dotted lines to emphasize that it is optional. Block 112 is indicated to be an optional step, in that the list that is collected need not be robust, so long as the list has substantially the largest coefficients. The details of one implementation of block 112 are described below, with reference to FIG. 5.

Then control passes to block 114, indicating the construction of a best hierarchical histogram to the robust sublist R (if present) or to the TPHW list L. The details of one implementation of block 114 are described below, with reference to FIG. 6.

Finally, block 116 indicates the output, storage or other use of the best hierarchical histogram that was constructed in block 114. Block 116 may be considered optional, in that the best hierarchical histogram need not be used each time that one is constructed. In any event, control passes back to block 104 to read in more data updates.

Figure 2:
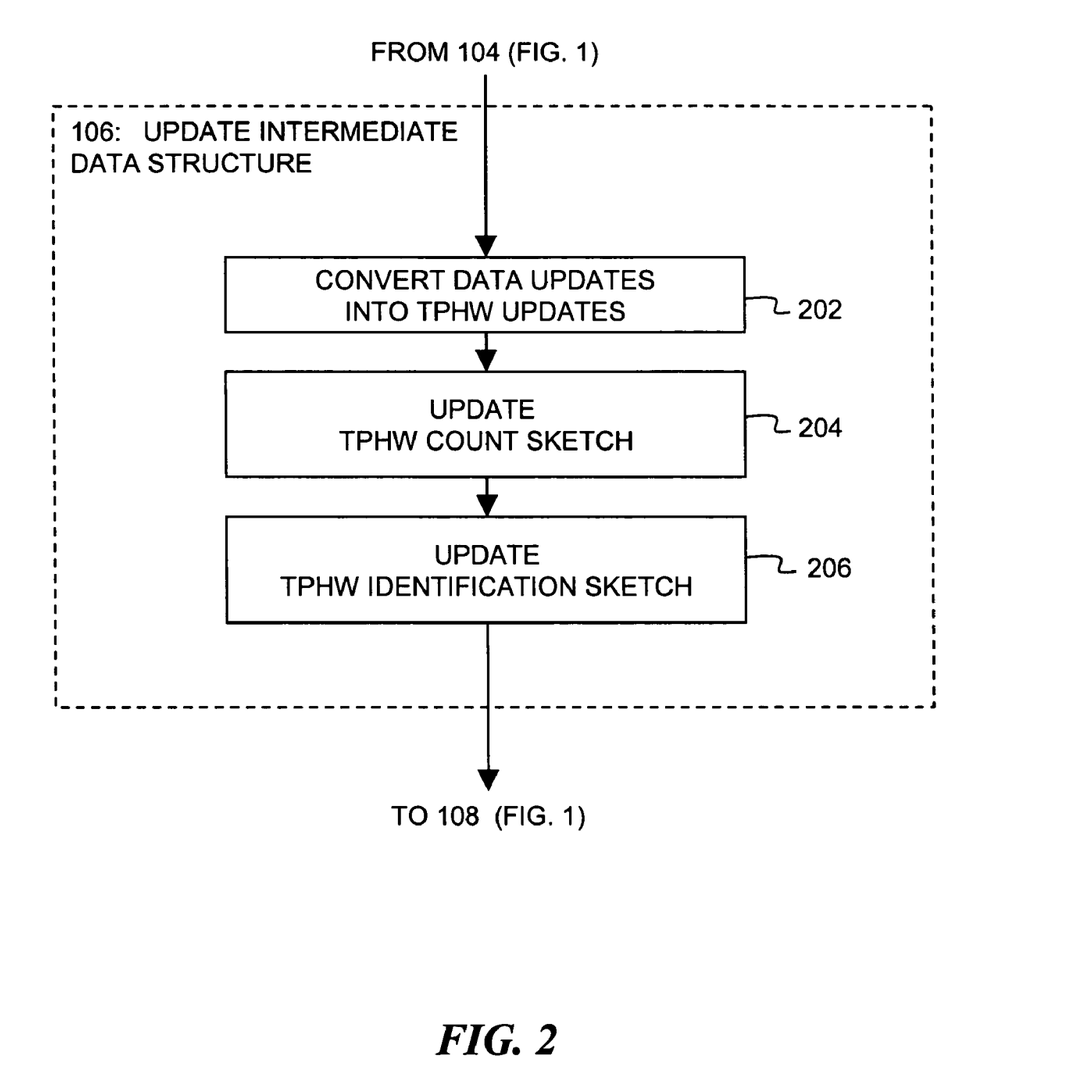
FIG. 2 is a flowchart illustrating one embodiment of step 106 (FIG. 1)

FIG. 2 is a flowchart illustrating one embodiment of step 106 (FIG. 1), updating the intermediate data structure. After data updates are read in, the data updates are converted into TPHW updates in block 202. That is, instead of operating on the data, the TPHWs are operated on; accordingly, the data updates are converted into TPHW updates. Thereafter, the TPHW count sketch is updated in block 204 and the TPHW identification (ID) sketch is updated in block 206. Collectively, the TPHW count sketch and TPHW ID sketch constitute the intermediate data structure. Thereafter, control passes back to FIG. 1 for a determination of whether a histogram is to be rebuilt at this time.

Figure 3:
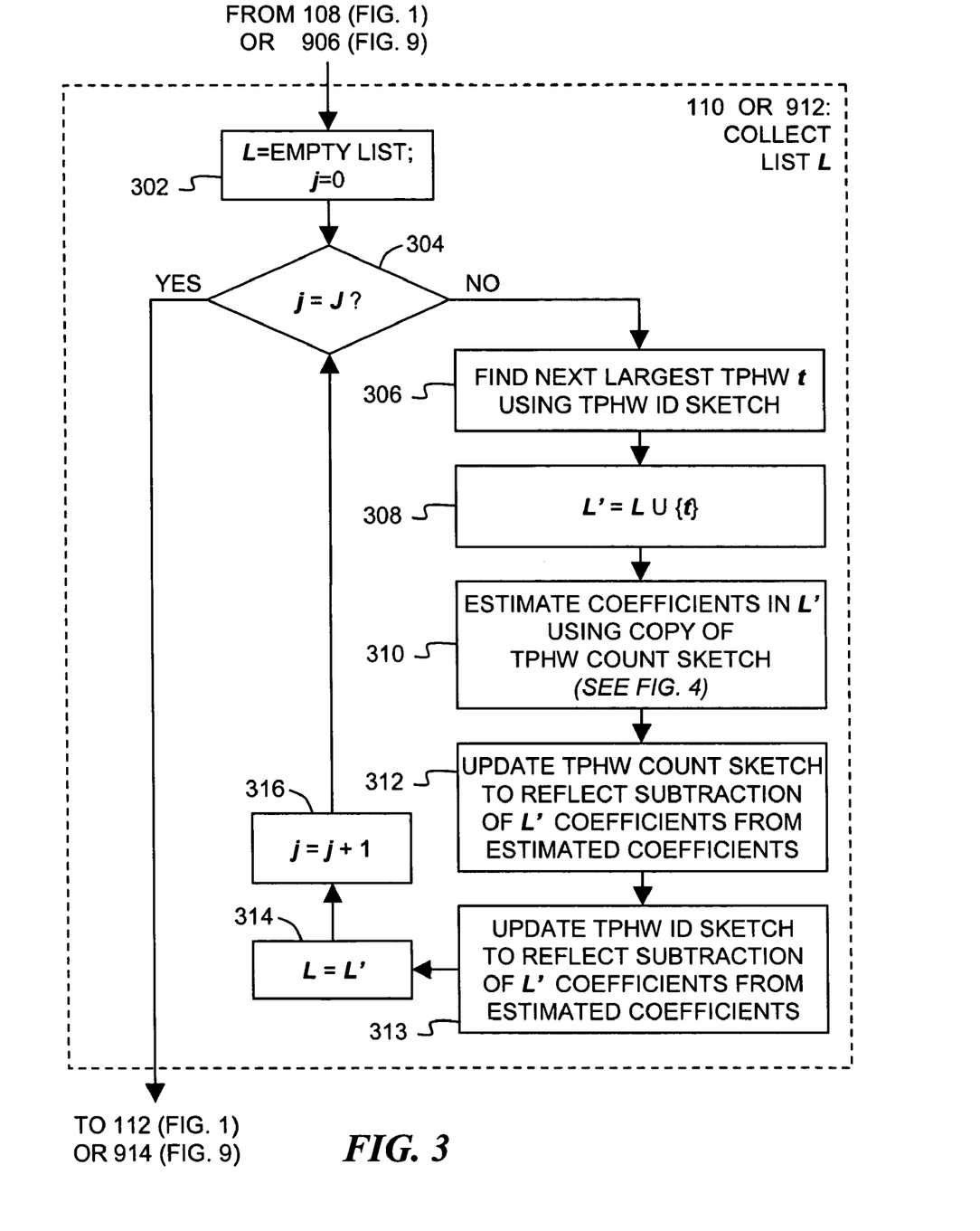
FIG. 3 is a flowchart illustrating one embodiment of step 110 (FIG. 1) or step 912 (FIG. 9)

FIG. 3 is a flowchart illustrating one embodiment of step 110 (FIG. 1) or step 912 (FIG. 9), the step of collecting a list L of TPHWs that have the largest coefficients. Referring to FIG. 3 block 302, the list L is initialized to being an empty list, and the loop index variable j is initialized to zero. Thereafter, control passes to a decision block 304.

Decision block 304 illustrates the determination of whether loop index variable j has reached the loop terminating value J. Speaking more conceptually, J represents the desired size of list L and is chosen large enough so that L contains sufficient information about the original data but small enough that the time to perform J iterations is acceptable. When j eventually reaches the terminating value J, control passes out of the loop to exit FIG. 3 altogether. However, assuming j has not yet reached J, control passes to a loop including blocks 306-316 and decision block 304.

Block 306 indicates the finding of a next largest TPHW t, as output from the TPHW ID sketch in response to an ID query.

Thereafter, in block 308, an intermediate working list L' is found by a union of list L and {t}. Here, the symbol {t} indicates a list containing only t.

Block 310 indicates the estimation of the coefficients in L', by using a copy of the TPHW count sketch. One implementation of this estimation process is described below, with reference to FIG. 4.

Block 312 indicates the updating of the TPHW count sketch to reflect subtraction of each coefficient in L' from the corresponding TPHW coefficient then represented by the count sketch. Block 313 indicates the updating of the TPHW ID sketch to reflect subtraction of each coefficient in L' from the corresponding TPHW coefficient then represented by the ID sketch. Collectively, blocks 312, 313 constitute updating the intermediate data structure to reflect subtraction of each coefficient in L' from the corresponding TPHW coefficient then represented by the histogram sketch.

Control then passes to block 314, in which list L takes on the value of L' before the loop index variable j is incremented in block 316. Thereafter, control passes back to decision block 304 to determine whether the incremented j=J and whether the loop 304-316 should be exited.

Figure 4:
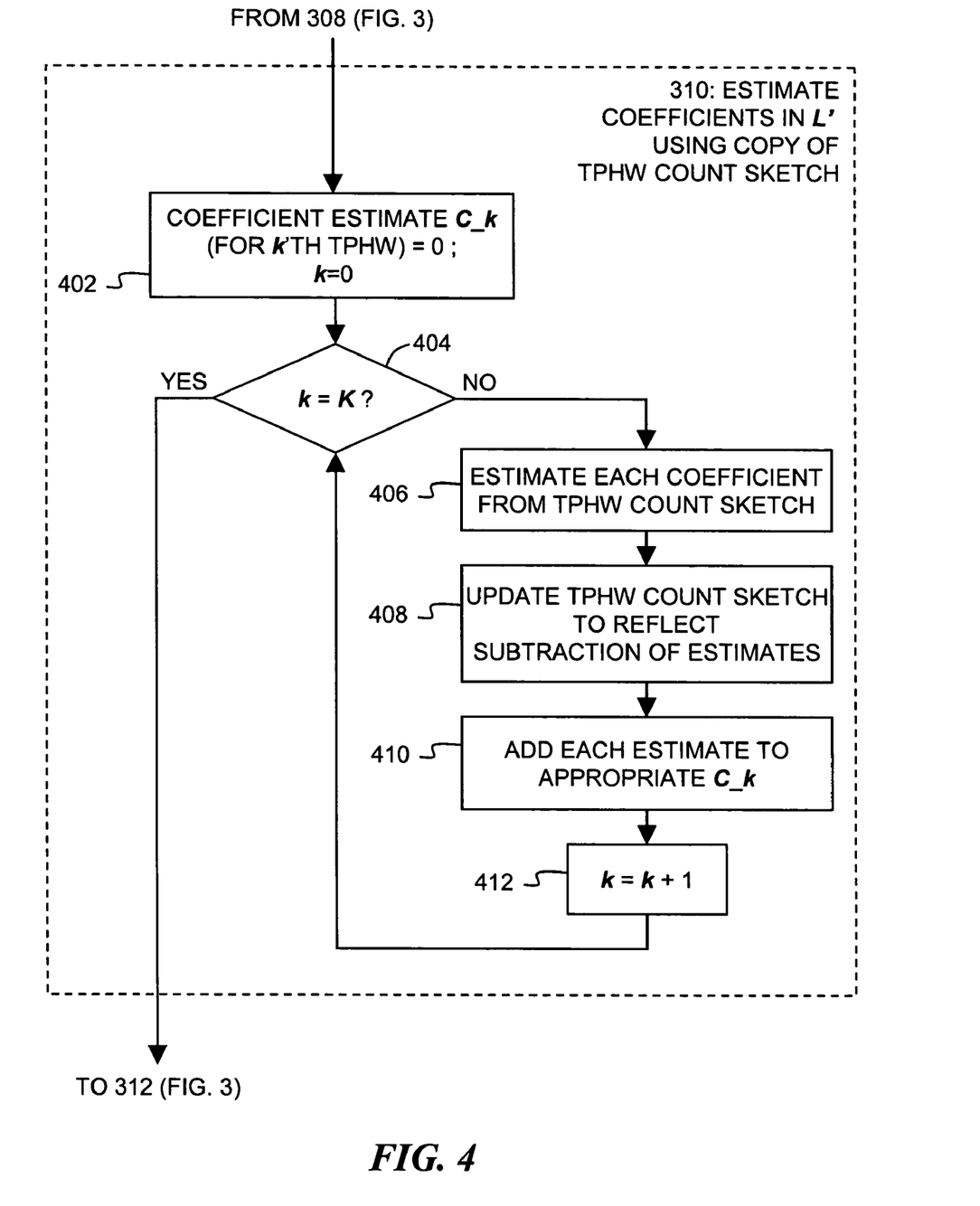
FIG. 4 is a flowchart illustrating one embodiment of step 310 (FIG. 3)

FIG. 4 is a flowchart illustrating one embodiment of step 310 (FIG. 3), estimating coefficients in intermediate list L' using a copy of the TPHW count sketch.

Block 402 is an initialization block, before a loop 404-412 is entered. In block 402, the coefficient estimate for a k-th TPHW, symbolized C_k, is set equal to zero. Also, the loop index variable k is set equal to zero before control passes to loop decision block 404.

Decision block 404 illustrates the determination of whether loop index variable k has reached the loop terminating value K. Speaking more conceptually, K is chosen to be large enough that good coefficient estimates result, yet small enough that the cost of performing K iterations is acceptable. The value of parameter K typically depends on the maximum allowable data value and the characteristics of the count sketch. When k eventually reaches the terminating value K, control passes out of the loop to exit FIG. 4 altogether. However, assuming k has not yet reached K, control passes to a loop beginning including blocks 406-412 and decision block 404.

Block 406 indicates the estimation of each coefficient, from the TPHW count sketch. Briefly, this coefficient estimation is given directly as output from a count sketch in response to a count query.

Block 408 indicates the updating of the TPHW count sketch to reflect the subtraction of the coefficient estimates from the corresponding coefficients then represented by the count sketch.

Block 410 indicates the addition of each coefficient estimate from the TPHW count sketch (from block 406) to the corresponding C_k. Now, C_k is the coefficient estimate for the k'th TPHW, where k signifies the current iteration of the loop.

Thereafter, control passes to block 412 where loop variable k is incremented for comparison to K in loop decision block 404.

Figure 5:
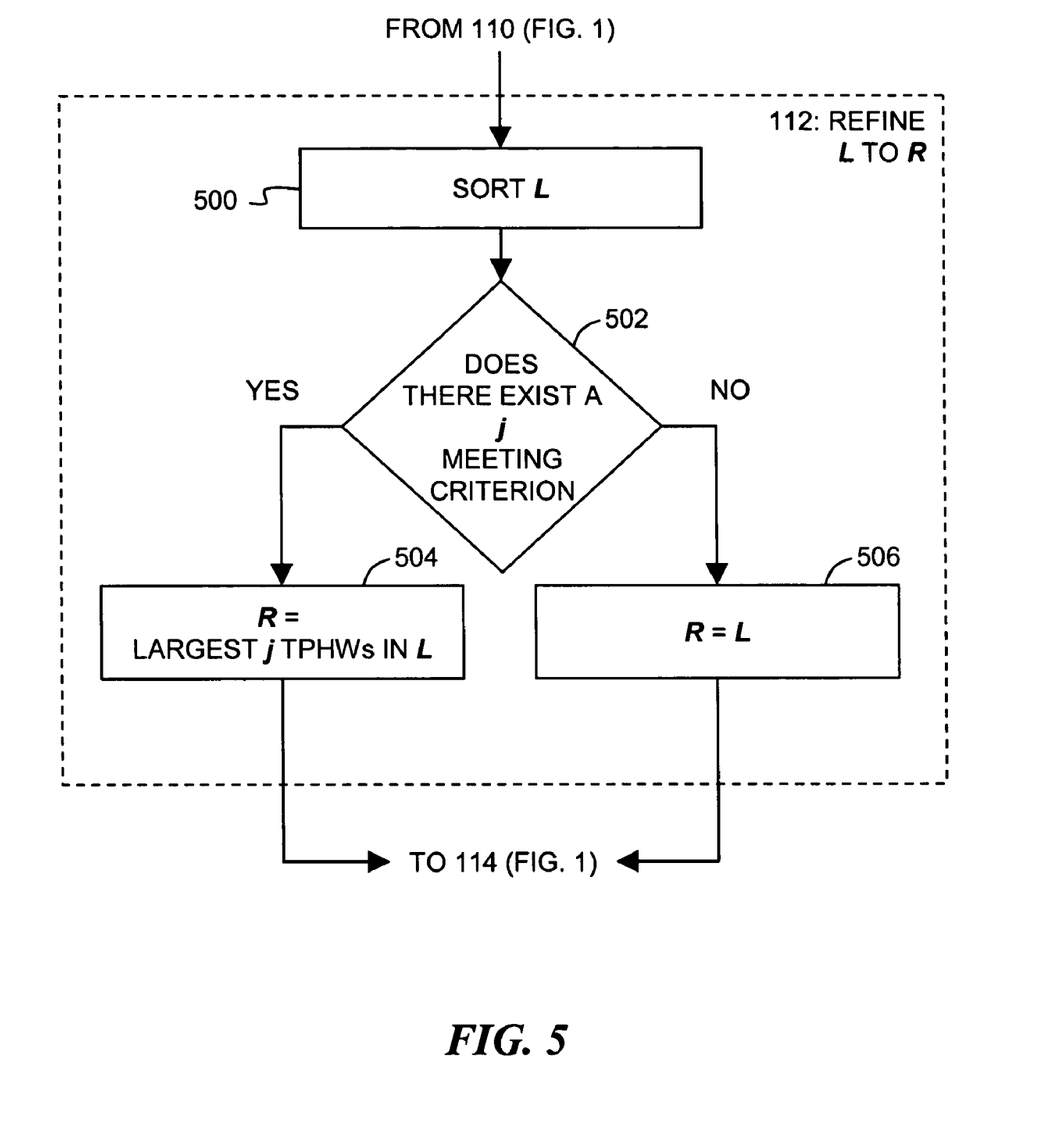
FIG. 5 is a flowchart illustrating one embodiment of step 112 (FIG. 1)

FIG. 5 is a flowchart illustrating one embodiment of step 112 (FIG. 1), of refining a list L to a robust sub-list R. First, block 500 indicates the sorting of list L by any suitable method, such as, for example, quiksort. Thereafter, control passes to a decision block 502.

Decision block 502 involves a determination of whether there exists a j meeting a criterion. In one embodiment, this criterion is whether there is a j such that the square of the (j+1)-th TPHW in L is small compared with the sum of squares of all TPHWs in L that are smaller than the (j+1)-th TPHW in L.

If there is such a j meeting the criterion, then the robust sub-list R is set equal to the largest j TPHWs from L (block 504). If there is no j meeting the criterion, then the robust sub-list R is set equal to the entire list L (block 506). In either event, R has been determined, and control then passes out to block 114 (FIG. 1).

Figure 6:
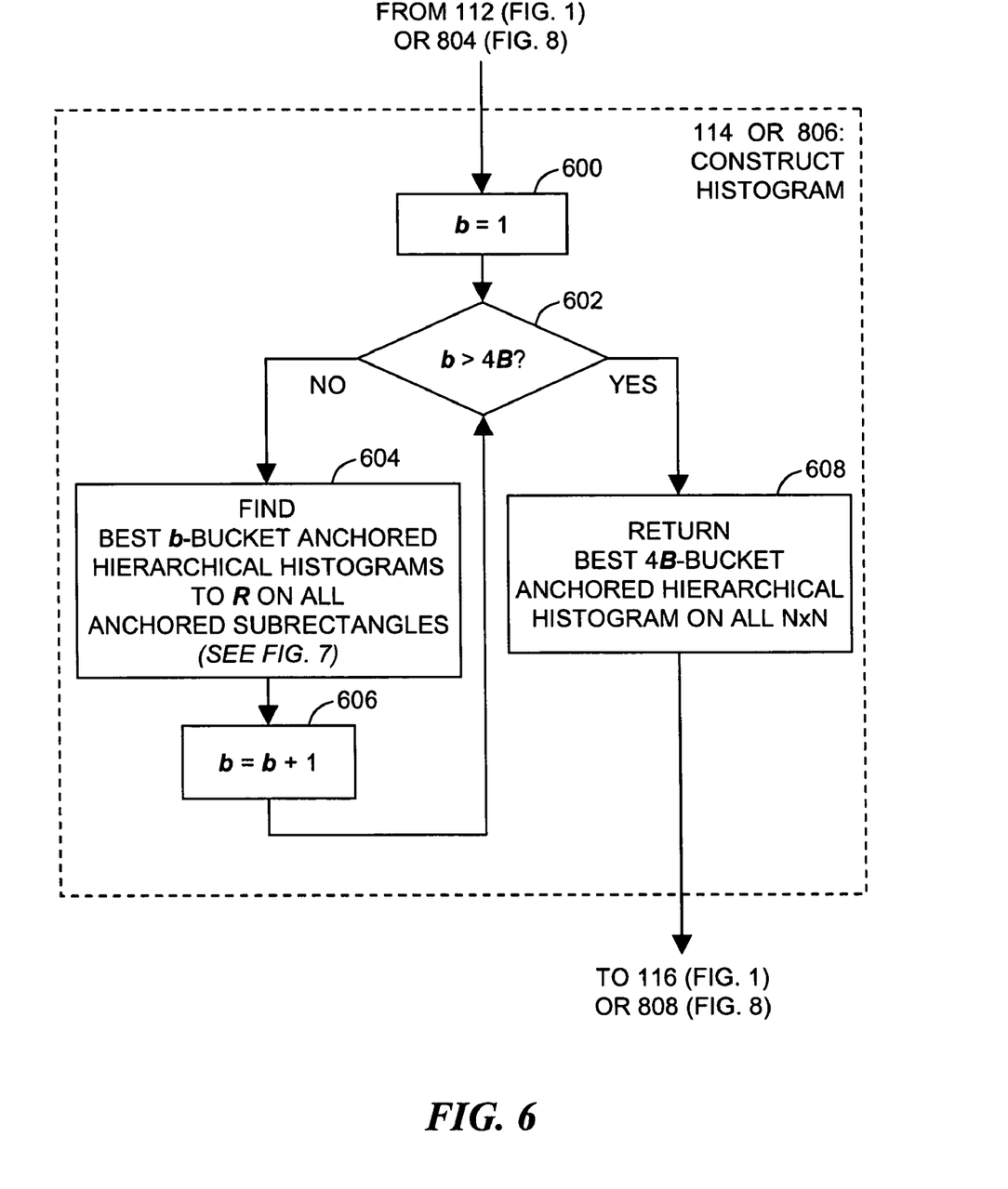
FIG. 6 is a flowchart illustrating one embodiment of step 114 (FIG. 1) or step 806 (FIG. 8)

FIG. 6 is a flowchart illustrating one embodiment of step 114 (FIG. 1) or step 806 (FIG. 8), that of constructing a best hierarchical histogram to either L or R (see FIG. 1 blocks 110, 112). In FIG. 6 block 600, the value of loop variable b is initialized to 1 before control passes to a decision block 602.

Decision block 602 indicates the determination of whether loop index variable b has exceeded the loop terminating value 4B. Speaking more conceptually, B represents the desired number of buckets in an ideal histogram. When b eventually exceeds the terminating value 4B, control passes out of the loop to block 608. However, assuming b has not yet exceeded 4B, control passes to a loop beginning including blocks 604, 606 and decision block 602.

Before b exceeds 4B, during each iteration of the loop block 604 indicates the finding of the best b-bucket anchored hierarchical histograms to R on all anchored subrectangles. (Refer to Terminology sub-section, above.) The details of one implementation of block 604 are discussed below, with reference to FIG. 7.

Thereafter, loop variable b is incremented so that the incremented value can be compared to 4B in decision block 602. When b finally exceeds 4B, control passes to block 408, which indicates the returning of the best 4B-bucket anchored hierarchical histogram on the entire N×N rectangle. The histogram being completed, control returns to the highest level flow charts (FIG. 1 or 8) where the histogram may be output, stored, or otherwise used.

Figure 7:
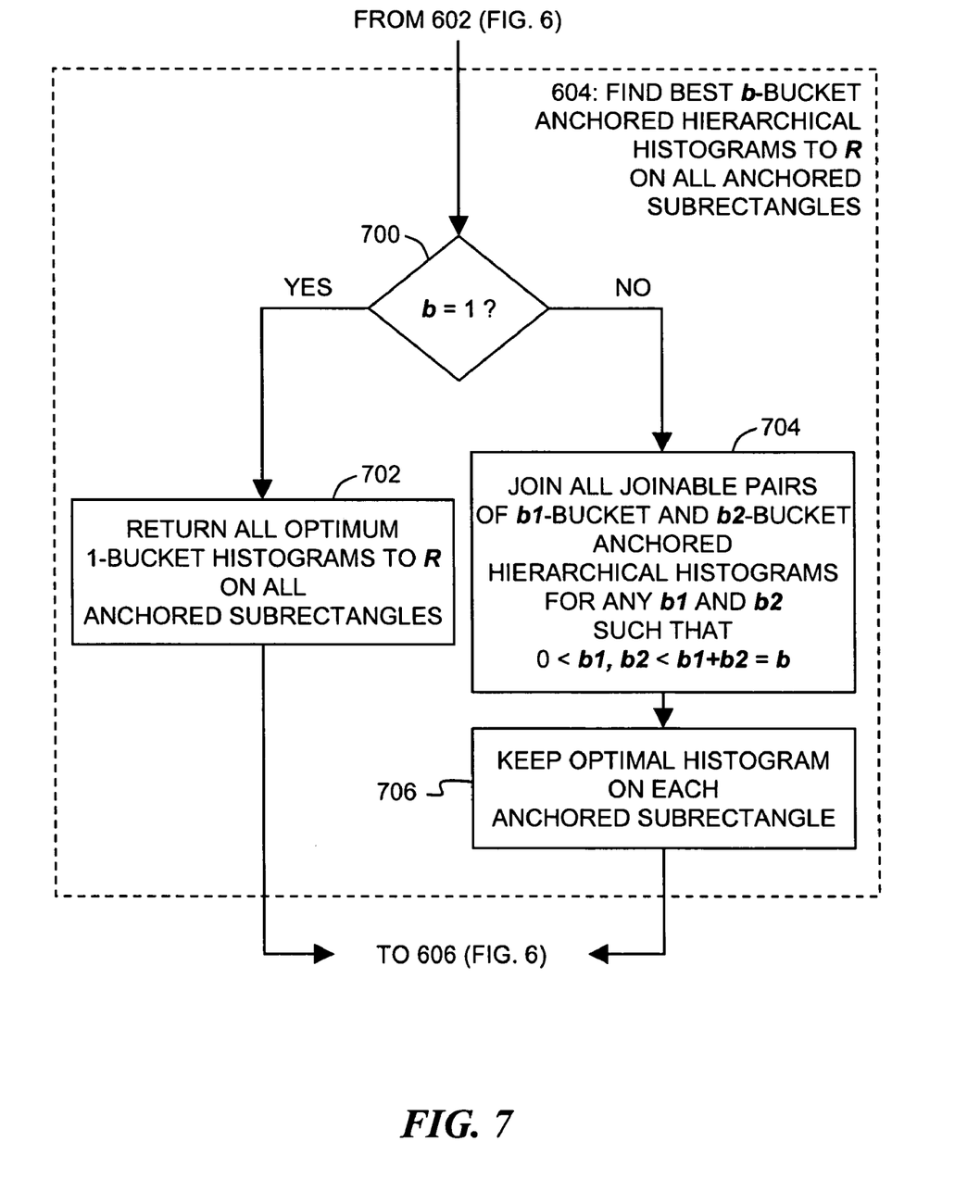
FIG. 7 is a flowchart illustrating one embodiment of step 604 (FIG. 6)

FIG. 7 is a flowchart illustrating one embodiment of step 604 (FIG. 6), illustrating step 604 of finding the best b-bucket anchored hierarchical histograms to R on all anchored subrectangles.

Decision block 700 indicates the determination of whether loop index variable b (from FIG. 6) exactly equals 1. Speaking more conceptually, b=1 indicates the starting of construction of anchored histograms from scratch, whereas b>1 indicates progress on building larger anchored histograms from existing histograms.

When b equals 1 (which occurs during the first iteration of loop 604/606 in FIG. 6), control passes to block 702. Block 702 indicates the returning of all optimum 1-bucket histograms to R on all anchored sub-rectangles.

However, assuming b is greater than 1 (which occurs during the second and subsequent iterations of loop 604/606 in FIG. 6), control passes to blocks 704 and 706. Block 704 indicates the joining of all joinable pairs of b1-bucket and b2-bucket anchored hierarchical histograms for any b1 and b2 such that 0 is less than either of b1 or b2, which are in turn less than the sum b1+b2, where b1+b2=b. Block 706 indicates the retention of each optimal histogram on each anchored subrectangle.

Control then passes back to block 606 (FIG. 6) for incrementing of b in loop 602-606.

Figure 8:
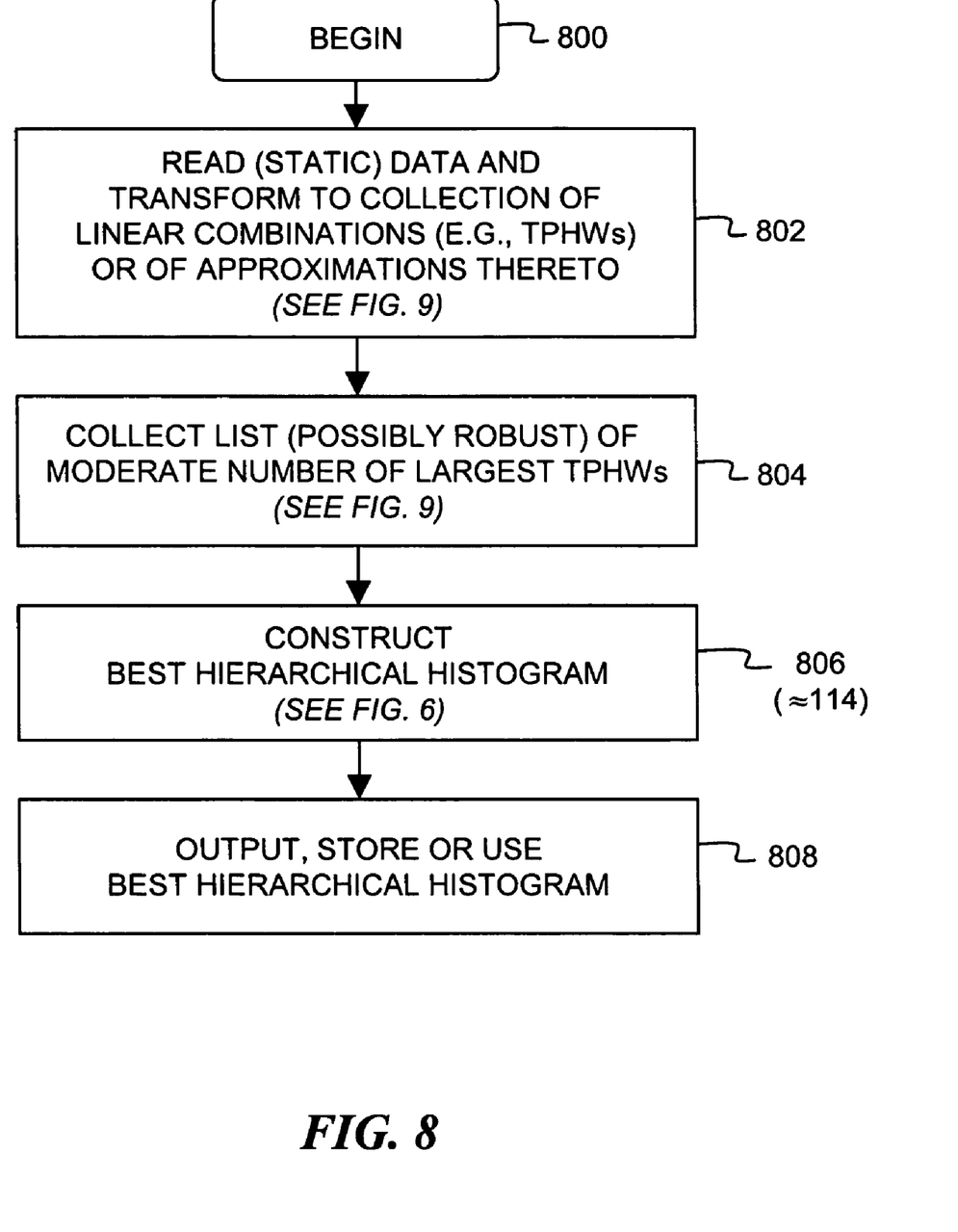
FIG. 8 is a high-level flowchart illustrating an embodiment of a method of creating a multidimensional histogram that is nearly-optimal for static (unchanging) data.

FIG. 8 is a high-level flowchart illustrating an embodiment of a method of creating a multidimensional histogram that is nearly-optimal for static (unchanging) data. In contrast to the FIG. 1 embodiment, there are no "data updates" such as those referenced in the dynamic (changing) data scenario of FIG. 1.

After the process begins (indicated by block 800), block 802 indicates the reading of the static data, and the transformation of that data to a collection of linear combinations, or of approximations to the linear combinations. In one embodiment, the linear combinations are tensor products of Haar wavelets (TPHWs). The details of one implementation of block 802 are discussed below, with reference to FIG. 9.

Block 804 indicates the step of collecting a robust list of a moderate number of the largest-coefficient TPHWs that were derived from the input data. As noted below with reference to FIG. 9, the list that is collected need not be robust, so long as it collects the TPHWs with the largest coefficients. The details of one implementation of block 804 are discussed below, with reference to FIG. 9.

Thereafter, block 806 indicates construction of a best hierarchical histogram to the list collected in block 804. The details of one implementation of block 806 are discussed above, with reference to FIG. 6.

Finally, block 808 indicates the output, storage or other use of the best hierarchical histogram constructed in block 806.

Figure 9:
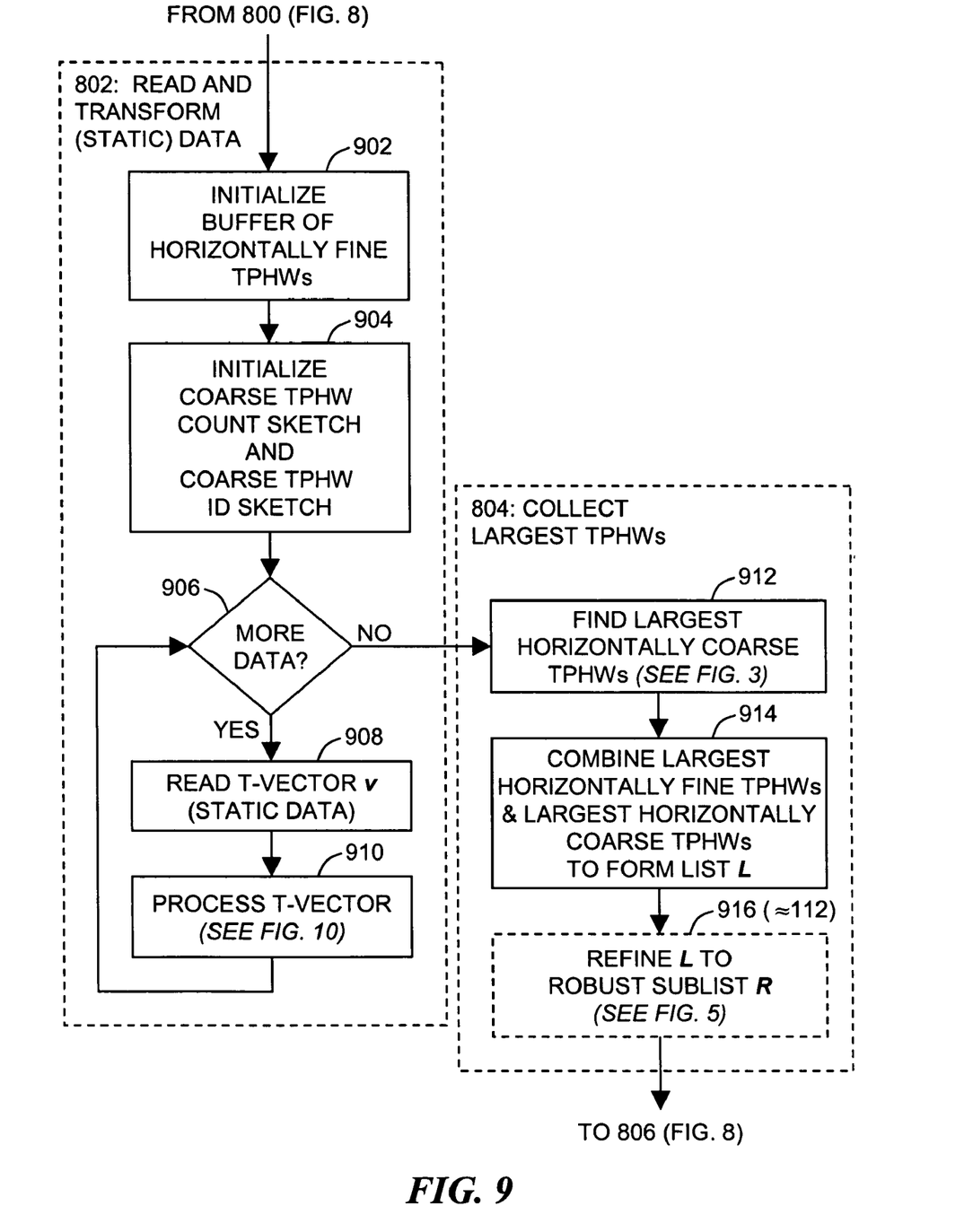
FIG. 9 is a flowchart illustrating one embodiment of steps 802 and 804 (FIG. 8)

FIG. 9 is a flowchart illustrating embodiments of steps 802 and 804 (FIG. 8).

Block 902 indicates the initialization of an initially-empty buffer of horizontally fine TPHWs.

Block 904 indicates the initialization of a coarse TPHW count sketch and a coarse TPHW ID sketch, as described above.

After these initialization steps, control passes to decision block 906, which determines whether there is data (or more data) to be read. Assuming there is data to be read, the data is read in the form of a T-vector v that represents the next T items of static data. As used herein, a T-vector is a collection of data items in a single row and in T consecutive columns, such that the column of the leftmost data item in the T-vector is a multiple of T. Thus the T-vectors form an array of N rows and N/T columns. T-vectors may be read one column at a time, from left to right. Within each column, T-vectors may be read from top to bottom. After being read in, the T-vector v is processed, for example, in accordance with the flowchart of FIG. 10, discussed below. After the T-vector is processed, control returns to the decision block 906 to determine whether any more data is to be read. Finally, when there is no more data to be read, control leaves block 802 and enters block 804.

Block 804 indicates the step of collecting a list of TPHWs with the largest coefficients. Within block 804, block 912 indicates finding the largest horizontally coarse TPHWs. In block 914, the largest horizontally fine TPHWs (computed in block 910) and the largest horizontally coarse TPHWs (found in block 912) are combined to form a list L. List L need not be robust.

After the largest-coefficient fine and coarse TPHWs are combined into list L, an optional step 916 may be performed. Block 912 indicates the refinement of list L into a robust sub-list R (see also, foregoing description of block 112 concerning robust sub-lists). One approach to performing this refinement has been described above, with reference to FIG. 5. Thereafter, control returns to FIG. 8 for construction of a best hierarchical histogram to either L or R.

Figure 10:
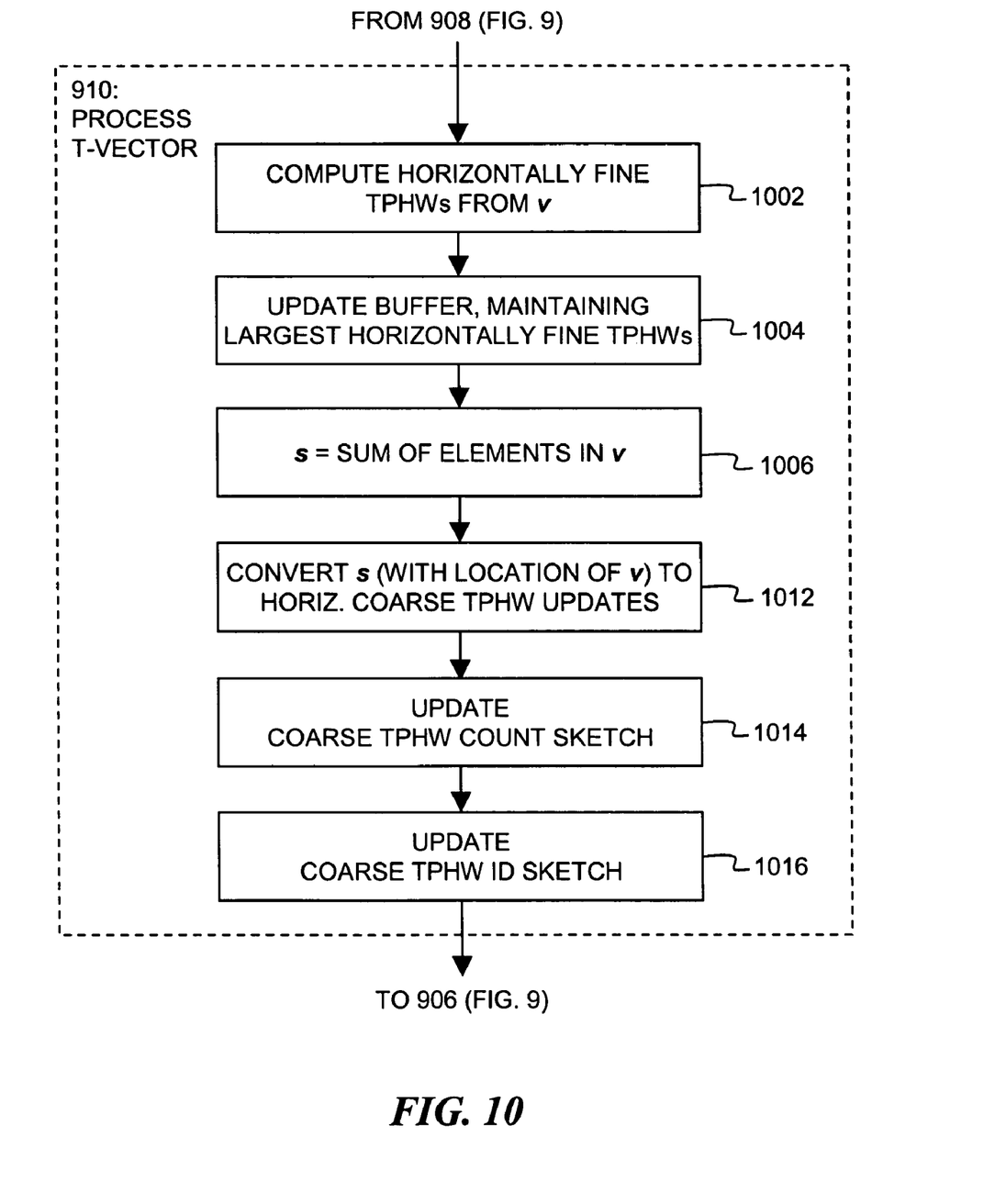
FIG. 10 is a flowchart illustrating one embodiment of step 910 (FIG. 9).

FIG. 10 is a flowchart illustrating one embodiment of step 910 (FIG. 9), processing of the T-vector embodying the static data input.

Block 1002 indicates the computation of horizontally fine TPHWs from the T-vector v.

Block 1004 indicates the updating of the buffer of horizontally fine TPHWs, maintaining the largest-coefficient TPHWs.

Block 1006 indicates the calculation of a sum s of the elements in the T-vector v.

Block 1008 indicates the conversion of s, including the location of v, to horizontally coarse TPHW updates.

Block 1010 indicates the updating of the coarse TPHW count sketch, and block 1012 indicates the updating of the coarse TPHW identification (ID) sketch. Collectively, the count sketch and ID sketch constitute an intermediate data structure that is updated before control returns to FIG. 9 before more data can be read.

The advantages of the foregoing methods are not merely formal. In the dynamic method, for example, the time to process an update or to build a histogram and the total space are all small, much less than the time to read all the data or space to store all the data, respectively. Known arrangements for processing multidimensional data have been very costly, either in time or space.

Moreover, a guarantee of the above approach is that it produces a 4B-bucket hierarchical histogram H such that, with high probability, the error of H is at most $(1+\epsilon)$ times the error of the optimal 4B-bucket hierarchical histogram. Because any B-bucket histogram can be refined to a 4B-bucket hierarchical histogram, it follows that the result is automatically at most $(1+\epsilon)$ times the error of the best histogram, hierarchical or not. Significantly, items that may "fail" are the count sketch and the ID sketch—entities whose characteristics are within control of the user. That is, for any data, there is just a small probability of failure, a probability that is within the user's control When considering hardware implementations of the foregoing methods, it is noteworthy that the methods can be parallelized in an especially advantageous way. In the dynamic setting, each site has its own count sketch. The various count sketches must agree on a small set of parameters (B, N, failure probability, and so forth) and a small collection of random coin flips. Each site processes its own updates into its own sketch. To build a histogram, all the sketches are combined to make a single sketch for the entire dataset. With this single sketch, the method proceeds as described above. This approach is communication-efficient because the total communication for s sites is just s times the size of a sketch, an amount that is typically much smaller than the total size of all the data.

Also provided, for the methods described herein, are computer program products (such as storage media) storing program instructions for execution on a computer system having at least one data processing device, which instructions when executed by the computer system cause the computer system to perform the methods described herein.

Further provided are systems for performing the methods described herein, the systems including at least one data processing element. Generally, these elements may be implemented as any appropriate computer(s) employing technology known by those skilled in the art to be appropriate to the functions performed. The computer(s) may be implemented using a conventional general purpose computer programmed according to the foregoing teachings, as will be apparent to those skilled in the computer art. Appropriate software can readily be prepared by programmers based on the teachings of the present disclosure. Suitable programming languages operating with available operating systems may be chosen.

General purpose computers may implement the foregoing methods, in which the computer housing may house a CPU (central processing unit), memory such as DRAM (dynamic random access memory), ROM (read only memory), EPROM (erasable programmable read only memory), EEPROM (electrically erasable programmable read only memory), SRAM (static random access memory), SDRAM (synchronous dynamic random access memory), and Flash RAM (random access memory), and other special purpose logic devices such as ASICs (application specific integrated circuits) or configurable logic devices such GAL (generic array logic) and reprogrammable FPGAs (field programmable gate arrays).

Each computer may also include plural input devices (for example, keyboard, microphone, and mouse), and a display controller for controlling a monitor. Additionally, the computer may include a floppy disk drive; other removable media devices (for example, compact disc, tape, and removable magneto optical media); and a hard disk or other fixed high-density media drives, connected using an appropriate device bus such as a SCSI (small computer system interface) bus, an Enhanced IDE (integrated drive electronics) bus, or an Ultra DMA (direct memory access) bus. The computer may also include a compact disc reader, a compact disc reader/writer unit, or a compact disc jukebox, which may be connected to the same device bus or to another device bus.

The arrangement provides at least one computer readable medium. Examples of computer readable media include compact discs, hard disks, floppy disks, tape, magneto optical disks, PROMs (for example, EPROM, EEPROM, Flash EPROM), DRAM, SRAM, SDRAM.

Stored on any one or on a combination of computer readable media is software for controlling both the hardware of the computer and for enabling the computer to interact with other elements, to perform the functions described above. Such software may include, but is not limited to, user applications, device drivers, operating systems, development tools, and so forth.

Such computer readable media further include a computer program product including computer executable code or computer executable instructions that, when executed, causes a computer to perform the methods disclosed above. The computer code may be any interpreted or executable code, including but not limited to scripts, interpreters, dynamic link libraries, Java classes, complete executable programs, and the like.

From the foregoing, it will be apparent to those skilled in the art that a variety of methods, systems, computer programs on recording media, and the like, are provided.

The present disclosure supports a method for maintaining a multidimensional histogram for a data array having a data array size, the method having a processing time substantially less than proportional to the data array size. The method involves (104) receiving a data update that indicates a change to data in the data array; (106) with the data update, updating an intermediate data structure having a size substantially smaller than the data array size, so that the updated intermediate data structure remains an at-least-approximate representation of the data in the data array as changed by the data update; (110) collecting a number of substantially-largest-coefficient linear combinations of then-current data, the number being small compared with the data array size; and (114) forming the multidimensional histogram as a histogram to an intermediate data array re synthesized from the collected linear combinations.

The step (114) of forming the multidimensional histogram may be executed unconditionally in response to reception of the data update.

The method may further involve (108) determining whether or not a multidimensional histogram should be formed in response to reception of the data update; and the step (114) of forming the multidimensional histogram may be executed conditionally, in response to an outcome of the determining step that the multidimensional histogram should be formed in response to the reception of the data update.

The intermediate data structure may constitutes a histogram sketch of the data that includes one or both of: an identification sketch of linear combinations of the data, the identification sketch being configured to identify, with limited error, linear combinations whose coefficients are large; and a count sketch of linear combinations of data, the count sketch being configured to approximate the coefficients of linear combinations.

The linear combinations may be tensor products of Haar wavelets (TPHWs) of data in the data array.

The method may further involve reducing the collection of linear combinations before forming the multidimensional histogram, by discarding a linear combination according to a criterion belonging to a group of criteria including: (a) a square of a largest coefficient of a discarded linear combination is small compared with a sum of squares of coefficients of all discarded linear combinations; (b) a square of a largest coefficient of a discarded linear combination is small compared with a sum of squares of a difference between a then-current data and an array represented by a collection of retained linear combinations; and (c) a square of a largest coefficient of a discarded linear combination is small compared with a sum of squares of a difference between a then-current data and an array represented by a collection of retained linear combinations, the sum of squares being approximated using a sum-of-squares sketch.

The step of updating the intermediate data structure may include combining plural pre-intermediate data structures, each of which may not itself be a faithful representation of the data in the data array.

The present disclosure also supports a method for preparing a multidimensional histogram for a data array, the data array characterized by a data array size and including data, the method having an execution time proportional to the data array size and using an amount of storage space substantially smaller than the data array size. The method involves (802) receiving data from the data array; (802)

transforming the data into linear combinations of data items, or of approximations of the linear combinations of data items; (804) collecting a moderate number of substantially-largest-coefficient linear combinations of the data; and (806) forming the multidimensional histogram as a histogram to the collected linear combinations.

The data receiving step may include reading the data in a reading sequence such that at least some of the data that is close together in the reading sequence is close together in a multidimensional grid, so as to facilitate the transforming step.

The linear combinations may be tensor products of Haar wavelets (TPHWs) of data in the data array.

The method may further involve reducing the collection of linear combinations before forming the multidimensional histogram, by discarding a linear combination according to a criterion belonging to a group of criteria including: (a) a square of a largest coefficient of a discarded linear combination is small compared with a sum of squares of coefficients of all discarded linear combinations; (b) a square of a largest coefficient of a discarded linear combination is small compared with a sum of squares of a difference between a then-current data and an array represented by a collection of retained linear combinations; and (c) a square of a largest coefficient of a discarded linear combination is small compared with a sum of squares of a difference between a then-current data and an array represented by a collection of retained linear combinations, the sum of squares being approximated using a sum-of-squares sketch.

The present disclosure further supports computer program products including computer executable code or computer executable instructions that, when executed, causes a computer system including at least one processing device to perform the methods described herein.

The present disclosure also supports systems configured to perform the methods described herein.

Many alternatives, modifications, and variations will be apparent to those skilled in the art in light of the above teachings. For example, the method is most easily described with reference to an N-by-N square, where N is a power of 2; however, it is straightforward to adapt the method to other rectangles, at low cost. Of course, the particular hardware and software platforms on which the methods are practiced, may be varied while remaining within the scope of the invention. It is therefore to be understood that within the scope of the appended claims and their equivalents, the invention may be practiced otherwise than as specifically described herein.

What is claimed is:

1. A computer implemented method of maintaining a multidimensional histogram for a data array having a data array size, the method having a processing time substantially less than proportional to the data array size, the method comprising:

receiving a data update that indicates a change to data in the data array;

with the data update, updating an intermediate data structure having a size substantially smaller than the data array size, so that the updated intermediate data structure remains an at-least-approximate representation of the data in the data array as changed by the data update;

collecting a number of substantially-largest-coefficient linear combinations of then-current data, the number being small compared with the data array size; and forming the multidimensional histogram as a histogram to an intermediate data array re-synthesized from the collected linear combinations; wherein the intermediate data structure constitutes a histogram sketch of the data that includes one or both of:

an identification sketch of linear combinations of the data, the identification sketch being configured to identify, with limited error, linear combinations whose coefficients are large; and a count sketch of linear combinations of data, the count sketch being configured to approximate the coefficients of linear combinations.

2. A computer implemented method of maintaining a multidimensional histogram for a data array having a data array size, the method having a processing time substantially less than proportional to the data array size, the method comprising:

receiving a data update that indicates a change to data in the data array;

with the data update, updating an intermediate data structure having a size substantially smaller than the data array size, so that the updated intermediate data structure remains an at-least-approximate representation of the data in the data array as changed by the data update;

collecting a number of substantially-largest-coefficient linear combinations of then-current data, the number being small compared with the data array size;

forming the multidimensional histogram as a histogram to an intermediate data array re-synthesized from the collected linear combinations; and reducing the collection of linear combinations before forming the multidimensional histogram, by discarding a linear combination according to a criterion belonging to a group of criteria including:

a) a square of a largest coefficient of a discarded linear combination is small compared with a sum of squares of coefficients of all discarded linear combinations;

b) a square of a largest coefficient of a discarded linear combination is small compared with a sum of squares of a difference between a then-current data and an array represented by a collection of retained linear combinations; and c) a square of a largest coefficient of a discarded linear combination is small compared with a sum of squares of a difference between a then-current data and an array represented by a collection of retained linear combinations, the sum of squares being approximated using a sum-of-squares sketch.

3. A computer implemented method of maintaining a multidimensional histogram for a data array having a data array size, the method having a processing time substantially less than proportional to the data array size, the method comprising:

receiving a data update that indicates a change to data in the data array;

with the data update, and updating an intermediate data structure having a size substantially smaller than the data array size, so that the updated intermediate data structure remains an at-least-approximate representation of the data in the data array as changed by the data update;

collecting a number of substantially-largest-coefficient linear combinations of then-current data, the number being small compared with the data array size; and forming the multidimensional histogram as a histogram to an intermediate data array re-synthesized from the collected linear combinations;

wherein the step of updating the intermediate data structure includes combining plural pre-intermediate data structures, each of which may not itself be a faithful representation of the data in the data array.

4. A computer implemented method of preparing a multidimensional histogram for a data array, the data array characterized by a data array size and including data, the method having an execution time proportional to the data array size and using an amount of storage space substantially smaller than the data array size, the method comprising:

receiving data from the data array;

transforming the data into linear combinations of data items, or of approximations of the linear combinations of data items;

collecting a moderate number of substantially-largest coefficient linear combinations of the data; and forming the multidimensional histogram as a histogram to the collected linear combinations.

5. The method of claim 4, wherein the data receiving step includes:

reading the data in a reading sequence such that at least some of the data that is close together in the reading sequence is close together in a multidimensional grid, so as to facilitate the transforming step.

6. The method of claim 4, wherein:

the linear combinations are tensor products of Haar wavelets (TPHWs) of data in the data array.

7. The method of claim 4, further comprising:

reducing the collection of linear combinations before forming the multidimensional histogram, by discarding a linear combination according to a criterion belonging to a group of criteria including:

a) a square of a largest coefficient of a discarded linear combination is small compared with a sum of squares of coefficients of all discarded linear combinations;

b) a square of a largest coefficient of a discarded linear combination is small compared with a sum of squares of a difference between a then-current data and a array represented by a collection of retained linear combinations; and c) a square of a largest coefficient of a discarded linear combination is small compared with a sum of squares of a difference between a then-current data and an array represented by a collection of retained linear combinations, the sum of squares being approximated using a sum-of-squares sketch.

* * * * *